Dec. 31, 1940.   H. A. SHARON   2,226,914
QUICK ATTACHABLE AND DETACHABLE HOSE COUPLINGS MADE IN ONE UNIT
Filed Sept. 16, 1939
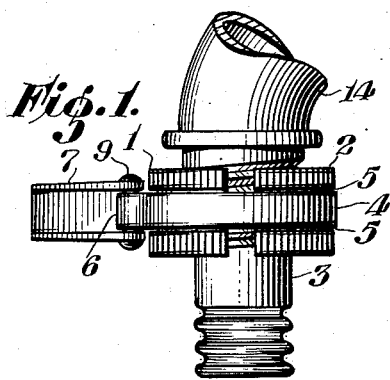
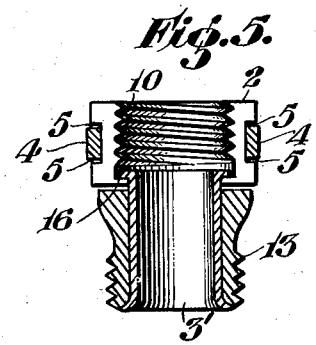
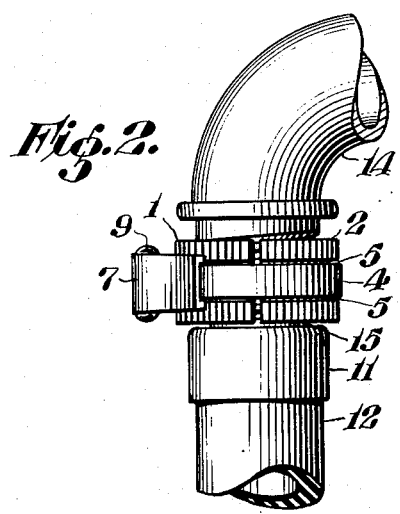
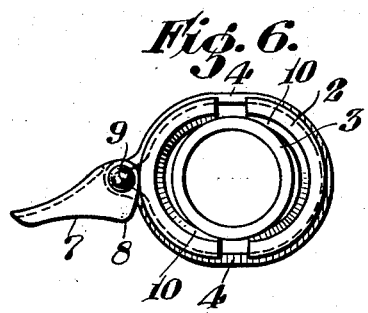
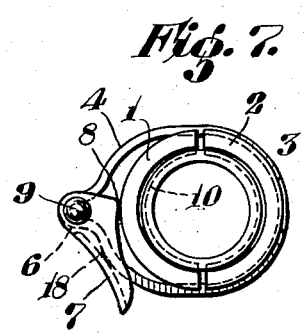
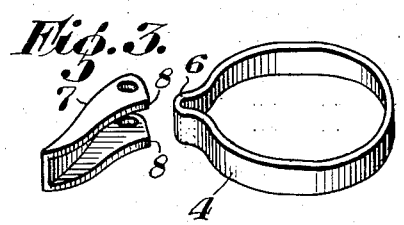
Inventor:
Hugh Alexander Sharon Patented Dec. 31, 1940

2,226,914

UNITED STATES PATENT OFFICE 2,226,914

QUICK ATTACHABLE AND DETACHABLE HOSE COUPLINGS MADE IN ONE UNIT

Hugh Alexander Sharon, South Pasadena, Calif.

Application September 16, 1939, Serial No. 295,330

2 Claims. (Cl. 285—129)

The invention relates to a quick attachable and detachable hose coupling, especially adapted to be applied to an externally threaded hydrant or spigot.

It is intended that this invention can be used by inserting the flanged corrugated tube 3 (as shown in Fig. 1 of the drawing), directly into the hose and fastened by the regular ferrule type of hose clamp, as shown at 11, Fig. 2, it is also adapted to be used by screwing into a standard hose coupling when tube 3' is fitted with a threaded collar as in 13, Fig. 5.

The invention is illustrated by the accompanying drawing

Fig. 1 is a view of the device as fitted to a regular standard internally threaded hose coupling that has been cut in halves across the threads, (said halves are hereinafter designated as jaws 1 and 2,) jaws 1 and 2 are shown in the open position around the standard flanged, corrugated tube 3.

Fig. 2 shows jaws 1 and 2 and cam lever 7 in the closed position with tube 3 inserted into the hose in the regular way.

Fig. 3 shows a perspective view of the double pointed cam lever 7 with cam points 8.

Fig. 4 is a perspective view of the jaw retaining band 4 showing the integrally formed eye 6.

Fig. 5 is a view showing a cross section of the coupling with threaded collar 13 as forced onto the flanged tube 3'.

Fig. 6 is an end view of the coupling in the open position ready to be closed by the cam lever 7.

Fig. 7 is an end view of the coupling as closed with cam lever 7 bearing against elongated retaining band 4 and the cams 8 bearing against jaw 1.

The internally threaded halves of the coupling or jaws 1 and 2 having an annular groove or channel 5 Fig. 5 the elongated jaw retaining band 4 is fitted into said groove or channel 5 of the jaws 1 and 2, jaw 2 is fastened to band 4 opposite from the eye end of said band 4, leaving jaw 1 free to slide in said band 4 enough to allow the entry of the threaded part of a hose-bibb or other externally threaded hose fitting.

The elongated band 4 has an integral eye formed in it as at 6 Fig. 4, cam lever 7 being pivoted to said eye by pivot pin 9.

The cams 8, Fig. 3 are an integral part of lever 7 and straddle the eye of retaining band 4.

In operation when lever 7 is in the open position Figs. 1 and 6 the loose sliding jaw 1 opens when the coupling is pushed over the threaded member it is to be connected to then the closing of lever 7 forces the cams 8 against jaw 1 sliding it toward jaw 2 thereby engaging the internally threaded jaws 1 and 2 in mesh with the threads of the member they are to be connected to, then a slight turn of the coupling tightens it against the standard gasket.

When in the closed position the cams 8 bearing against jaw 1 are slightly past the center line drawn from the center of the coupling to the center of the pivot pin, thereby forming a toggle action lock with lever 7 bearing against the retaining band 4 as at 18 Fig. 7.

The jaws 1 and 2 having internal flanges 15, Fig. 5, are retained between flange 16 of tube 3' and collar 13 by the retaining band 4, are free to slide or turn on tube 3'. The ferrule clamp 11, Fig. 2 replaces collar 13, Fig. 5.

The cross section Fig. 5 shows the cut away portion of the threads of the jaws at 10.

I claim:

1. An improvement in a quick attachable and detachable hose coupling, made in one unit, that slips over and meshes directly with the threads of a hose-bibb, hydrant and other externally threaded hose fitting of like size and thread, by means of applying a device to a standard hose coupling that has been cut in halves across the threads, said device consists of an elongated retaining band fitted into the annular groove or channel of the halves or jaws, said band has an integrally formed eye at one extremity of said band, one jaw being fastened to the opposite extremity from the said eye, leaving the other jaw free to move laterally in the said retaining band when operated by the cam lever as provided, the said lever has two cams integrally attached thereto that straddles the eye of said band and is pivoted to said eye, the said cam lever is the means by which the sliding jaw is closed, then a slight turn tightens the coupling to the member it is connected to, in this closed position the aforesaid cams are in a locking position holding the two jaws tightly together, a slight unscrewing movement releases the tension on the lever allowing the lever to open freely and the coupling to be detached.

2. The combination of an endless elongated band fitting into the grooves of the semi circular halves of an internally threaded hose coupling, for retaining the said semi circular halves around the flanged tube of a hose coupling, one of the said semi circular halves being fastened to one extremity of said band, leaving the other half free to slide laterally in the said endless elongated retaining band, the said free sliding half being operated by a double contacting cam lever, said cam lever being pivoted to an eye formed in the aforesaid band.

HUGH ALEXANDER SHARON.